United States Patent
Bai et al.

(10) Patent No.: US 8,210,066 B2
(45) Date of Patent: Jul. 3, 2012

(54) ELECTROMAGNETIC SYNCHRONIZER ACTUATING SYSTEM

(75) Inventors: Shushan Bai, Ann Arbor, MI (US); Vijay A. Neelakantan, Rochester Hills, MI (US); Paul G. Otanez, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 431 days.

(21) Appl. No.: 12/614,679

(22) Filed: Nov. 9, 2009

(65) Prior Publication Data
US 2011/0107864 A1  May 12, 2011

(51) Int. Cl.
*B60K 17/04* (2006.01)
(52) U.S. Cl. .............. 74/473.12; 74/473.36; 74/473.37; 74/335
(58) Field of Classification Search ............... 74/473.1, 74/473.12, 473.36, 473.37, 335, 340
See application file for complete search history.

(56) References Cited

U.S. PATENT DOCUMENTS

| | | | | |
|---|---|---|---|---|
| 5,460,060 A | * | 10/1995 | Nellums | 74/473.12 |
| 2001/0037698 A1 | * | 11/2001 | Yamamoto et al. | 74/335 |
| 2004/0254040 A1 | * | 12/2004 | Somschor et al. | 475/149 |
| 2006/0011008 A1 | * | 1/2006 | Hara et al. | 74/473.36 |
| 2007/0216402 A1 | * | 9/2007 | Blessing et al. | 324/207.24 |
| 2009/0235770 A1 | * | 9/2009 | Bader et al. | 74/473.1 |
| 2009/0282943 A1 | * | 11/2009 | Muller | 74/473.12 |
| 2010/0242642 A1 | * | 9/2010 | Ganter | 74/89.23 |

* cited by examiner

*Primary Examiner* — David M Fenstermacher (57) ABSTRACT

An assembly for actuating a synchronizer includes a shift fork, a shift rail, and a permanent magnet connected to the shift rail. A first control coil is disposed in proximity to the permanent magnet. The first control coil is operable to produce a magnetomotive force on the permanent magnet in a first direction when a current is applied to the first control coil. A second control coil is disposed in proximity to the permanent magnet. The second control coil is operable to produce a magnetomotive force on the permanent magnet in a second direction when a current is applied to the second control coil. The permanent magnet is moved to a first position when the current is applied to the first control coil and the permanent magnet is moved to a second position when the current is applied to the second control coil. Movement of the magnet in turn moves the synchronizer between engaged positions.

16 Claims, 3 Drawing Sheets

ELECTROMAGNETIC SYNCHRONIZER ACTUATING SYSTEM

FIELD

The present disclosure relates to electromagnetic actuating systems in transmissions, and more particularly to a three-position electromagnetic synchronizer actuating system with self position sensing capability.

BACKGROUND

The statements in this section merely provide background information related to the present disclosure and may or may not constitute prior art.

A typical manual transmission or a dual clutch transmission (DCT) includes a plurality of gear sets that are selectively engaged by a plurality of torque transmitting devices, such as, for example, dog clutches or synchronizers. The synchronizers are preferably moved between one or two engaged positions and a neutral position. The synchronizers are actuated by a synchronizer actuator. The synchronizer actuator generally includes a shift fork connected to the synchronizer, a shift rail connected to the shift fork, and an actuator that contacts and moves the shift rail. Typically, these actuators that move the shift rail, and therefore the position of the synchronizer, are electro-mechanical or electro-hydraulic actuators. Electro-mechanical and electro-hydraulic actuators typically include closed loop position control and separate position sensors. While effective, there is room in the art for alternative synchronizer actuating systems that reduce complex components, eliminates closed loop position control, and have self-positioning sensing capability.

SUMMARY

The present invention provides a synchronizer actuating system for use in a manual transmission automated or a dual clutch transmission. In one example of the present invention, an assembly for actuating a synchronizer includes a shift fork operatively associated with the synchronizer, a shift rail movable along an axis and connected to the shift fork, and a permanent magnet connected to the shift rail. A first control coil is disposed in proximity to the permanent magnet. The first control coil is operable to produce a magnetomotive force on the permanent magnet in a first direction when a current is applied to the first control coil in a first rotational direction. A second control coil is disposed in proximity to the permanent magnet. The second control coil is operable to produce a magnetomotive force on the permanent magnet in a second direction when a current is applied to the second control coil in a second rotational direction. The permanent magnet is moved to a first position when the current is applied to the first control coil and the permanent magnet is moved to a second position when the current is applied to the second control coil.

In another example of the present invention, the first control coil is operable to produce a magnetomotive force on the permanent magnet in the second direction when a current is applied to the first control coil in the second rotational direction and the second control coil is operable to produce a magnetomotive force on the permanent magnet in the first direction when a current is applied to the second control coil in the first rotational direction. The permanent magnet is moved to the first position when the current is applied to the first control coil in the first rotational direction and the current is applied to the second control coil in the first rotational direction. The permanent magnet is moved to the second position when the current is applied to the first control coil in the second rotational direction and the current is applied to the second control coil in the second rotational direction, and the permanent magnet is moved to a third position when the current is applied to the first control coil in either the first or second rotational directions and the current is applied to the second control coil in a rotational direction opposite to that applied to the first control coil.

In yet another example of the present invention, the first position of the magnet corresponds to a first engaged position of the synchronizer, the second position of the magnet corresponds to a second engaged position of the synchronizer, and the third position of the magnet corresponds to a neutral position of the synchronizer.

In yet another example of the present invention, a power source is connected to the first and second control coils by a plurality of wires, wherein the power source is operable to apply a voltage to the first and second control coils in order to induce the current in the first and second control coils.

In yet another example of the present invention, a current sensor is coupled to at least one of the plurality of wires for sensing a current in at least one of the plurality of wires, wherein the current sensor is in communication with a controller, wherein the controller is in communication with the power source, and wherein the controller is operable to determine the position of the permanent magnet based on the sensed current and the applied voltage from the power source.

In yet another example of the present invention, the first control coil and the second control coil are disposed adjacent one another and are both coaxial with the shift rail, and wherein the permanent magnet has an axis of polarity that is coaxial with the first control coil and the second control coil, and wherein the permanent magnet is at least partially disposed within the first control coil and the second control coil.

In yet another example of the present invention, the shift rail, shift fork, and permanent magnet are moveable along an axis, and the permanent magnet has a first end having a first polarity disposed on the axis and a second end having a second polarity disposed on the axis.

In yet another example of the present invention, a detent system is connected to the shift rail for keeping the permanent magnet in one of the first, second, and third positions when no current is applied to the first and second control coils.

In yet another example of the present invention, a second permanent magnet is connected to an end of the shift rail and a third control coil is disposed in proximity to the second permanent magnet, wherein the first control coil is operable to produce a magnetomotive force on the permanent magnet in a third direction when a current is applied to the third control coil, and wherein the permanent magnet is moved to a third position when the current is applied to the third control coil.

In yet another example of the present invention, the third control coil is disposed perpendicular relative to the first and second control coils, the second permanent magnet is disposed on the shift rail perpendicular relative to the permanent magnet, and the third control coil and the second permanent magnet are coaxial.

In yet another example of the present invention, a first sensor coil and a second sensor coil are each disposed proximate the second permanent magnet, the first sensor coil is connected with a power source for inducing a current in the first sensor coil, the second sensor coil is in communication with a controller, the controller is in communication with the power source, and the controller is operable to determine the position of the second permanent magnet based on the sensed current induced in the second sensor coil and the applied voltage from the power source.

In yet another example of the present invention, an assembly for actuating a synchronizer in a transmission includes a shift fork operatively associated with the synchronizer, a shift rail moveable along an axis and connected to the shift fork, a first permanent magnet connected to the shift rail, a second permanent magnet connected to the shift rail adjacent the first permanent magnet, and a third permanent magnet connected to the shift rail adjacent the second permanent magnet, wherein the first, second, and third permanent magnets each have an axis of polarity perpendicular to the axis of the shift rail. A first control coil is disposed in proximity to the first permanent magnet, wherein the first control coil is operable to produce a magnetomotive force on the first permanent magnet to move the first permanent magnet to be coaxial with the first control coil when a current is applied to the first control coil. A second control coil is disposed in proximity to the second permanent magnet, wherein the second control coil is operable to produce a magnetomotive force on the second permanent magnet to move the second permanent magnet to be coaxial with the second control coil when a current is applied to the second control coil. A third control coil is disposed in proximity to the third permanent magnet, wherein the third control coil is operable to produce a magnetomotive force on the third permanent magnet to move the third permanent magnet to be coaxial with the third control coil when a current is applied to the third control coil.

In another example of the present invention, alignment of the axis of polarity of the first permanent magnet with the axis of the first control coil corresponds to a first engaged position of the synchronizer, alignment of the axis of polarity of the second permanent magnet with the axis of the second control coil corresponds to a neutral position of the synchronizer, and alignment of the axis of polarity of the third permanent magnet with the axis of the third control coil corresponds to a second engaged position of the synchronizer.

In yet another example of the present invention, a power source is connected to the first, second, and third control coils by a plurality of wires, wherein the power source is operable to apply a voltage to the first, second, and third control coils in order to induce the current in the first, second, and third control coils.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
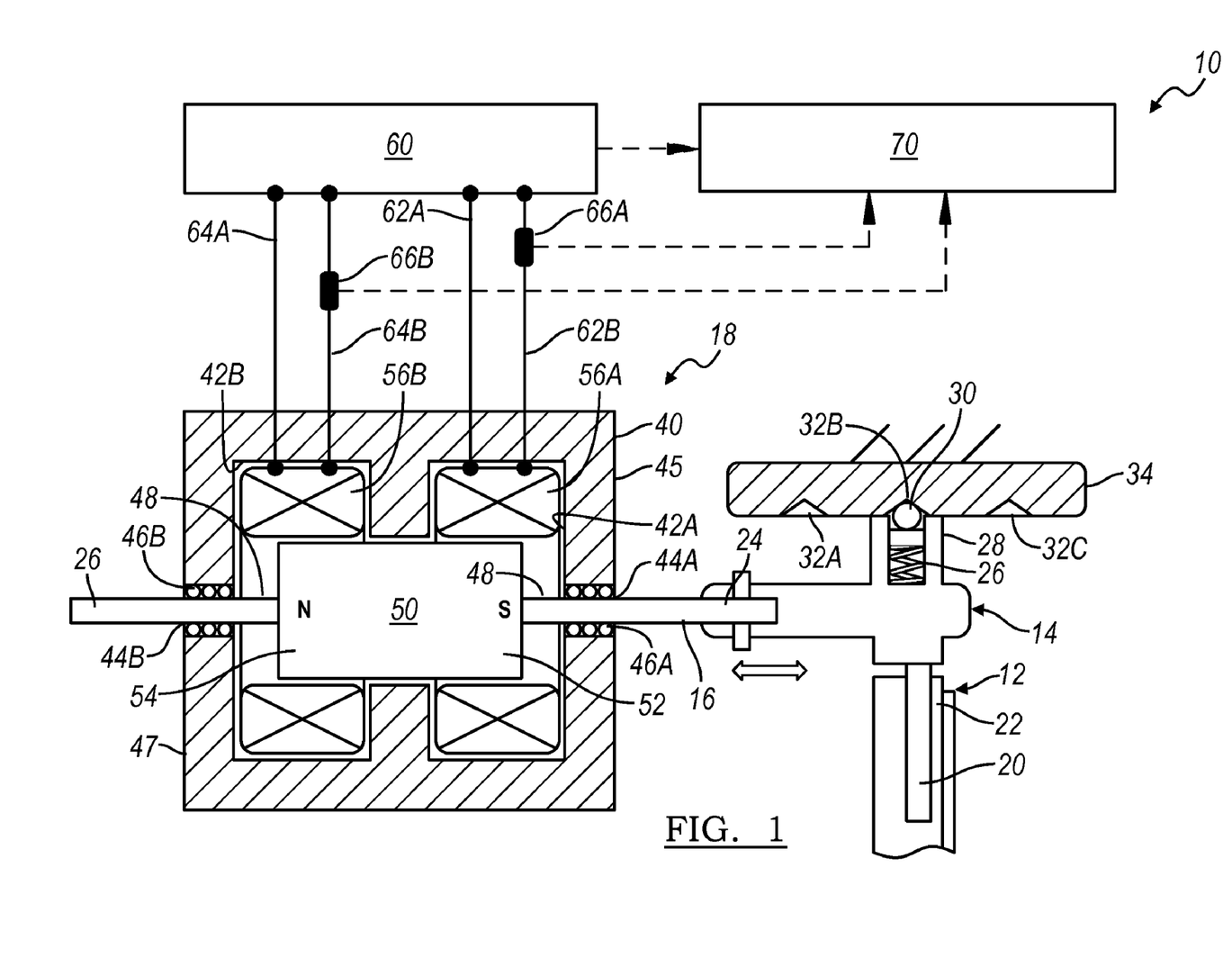
FIG. 1 is a cross-sectional view of an embodiment of a synchronizer actuating assembly according to the principles of the present invention.

With reference to FIG. 1, a synchronizer actuating assembly is shown and generally indicated by reference number 10. The synchronizer actuating assembly 10 is configured to actuate at least one synchronizer 12 in an automated manual transmission or a dual clutch transmission. The transmission may have any number of synchronizers 12 and any number of synchronizer actuating assemblies 10 without departing from the scope of the present invention. The synchronizer 12 is a two-way synchronizer capable of movement between a first engaged position, a second engaged position, and a neutral or disengaged position. In each of the engaged positions, the synchronizer 12 is operable to rotationally couple two components, such as a shaft and gear, together in order to transfer torque between the two components. In the neutral position, the synchronizer 12 is not engaged with at least one of the components and does not transfer torque between the two components. Actuation of a plurality of synchronizers 12 by a plurality of synchronizer actuating assemblies 10 allows the transmission to produce a plurality of forward and reverse gear ratios. It should be appreciated that the synchronizer 12 may be a one-way synchronizer having only one engaged position without departing from the scope of the present invention. Furthermore, it should be appreciated that the synchronizer actuating assembly 10 may be used to engage more than one synchronizer 12 without departing from the scope of the present invention (e.g., the synchronizer actuating assembly 10 may be used to actuate two one-way synchronizers).

The synchronizer actuating assembly 10 includes a shift fork 14 connected to a shift rail 16 and an electromagnetic actuator 18 for actuating the shift fork 14 and the shift rail 16, as will be described in greater detail below. The shift fork 14 includes a pair of extending fork arms 20, only one of which is shown, that grip a synchronizer sleeve 22. The synchronizer sleeve 22 is connected with the synchronizer 12.

The shift fork 14 includes a detent or positioning system 24. The detent system 24 is used to maintain the position of the shift fork 14, and therefore the synchronizer 12, in either of the engaged positions and the neutral position, as will be described in greater detail below. The detent system 24 includes a biasing member 26 disposed within a housing 28 of the shift fork 14. The biasing member 26 may be a spring or any other device operable to provide a biasing force. A ball 30 is disposed at least partially within the housing 28 and is biased by the biasing member 26 towards a plurality of detents 32A, 32B, and 32C. The detents 32A-C may be disposed in any housing or member 34 that is fixed or stationary relative to the synchronizer 12. Each of the detents 32A-C are positioned relative to the synchronizer 12 such that each of the detents 32A-C correspond to one of the first engaged position, the neutral position, and the second engaged position of the synchronizer 12, respectively. When the shift fork 14 is aligned with one of the detents 32A-C, the biasing member 26 biases the ball 30 into one of the detents 32A-C. With the ball 30 seated in one of the detents 32A-C, the shift fork 14 is prevented from moving until such time as a force is exerted on the shift fork 14 sufficient to unseat the ball 30.

The shift rail 16 is, in the example provided, an elongated member having a first end 24 opposite a second end 26. The first end 24 is connected to the shift fork 14. Both the shift rail 16 and the shift fork 14 are moveable in the direction of the arrow shown in FIG. 1.

The electromagnetic actuator 18 includes a housing 40 that defines two connected, spaced apart chambers 42A and 42B. A first opening 44A is disposed in a side 45 of the housing 40 and communicates with the first chamber 42A. A first linear bearing 46A is disposed within the first opening 44A. A second opening 44B is disposed in a side 47 opposite the side 45 of the housing 40 and communicates with the second chamber 42B. A second linear bearing 46B is disposed within the second opening 44B.

A portion 48 of the shift rail 16 is slidably disposed within the housing 40 of the electromagnetic actuator 18 such that the shift rail 16 is supported by the linear bearings 46A and 46B. The shift rail 16, and accordingly the shift fork 14, are moveable in a linear direction as indicated by the arrows shown in FIG. 1. A permanent magnet 50 is disposed on and connected to the portion 48 of the shift rail 16 within the housing 40. The permanent magnet 50 may be any object made from a ferromagnetic material that is "magnetized" and creates its own constant magnetic field. The permanent magnet 50 includes a first pole end 52 and a second pole end 54. The first pole end 52 and the second pole end 54 are disposed opposite one another and are co-axial with the shift rail 16. The first pole end 52 is disposed within the first chamber 42A of the housing 40 and the second pole end 54 is disposed within the second chamber 42B. In the example provided, the first pole end 52 is a "South" pole and the second pole end 54 is a "North" pole end, however, it should be appreciated that the first pole end 52 and the second pole end 54 may be switched without departing from the scope of the present invention.

The electromagnetic actuator 18 further includes a first control coil 56A and a second control coil 56B disposed within the housing 40. The first control coil 56A is disposed within the first chamber 42A. The first control coil 56A is wound around the first pole end 52 of the permanent magnet 50 forming a cylinder with the permanent magnet 50 disposed therein. The second control coil 56B is disposed within the second chamber 42B. The second control coil 56B is wound around the second pole end 54 of the permanent magnet 50 forming a cylinder with the permanent magnet 50 disposed therein.

An electrical current is selectively applied to the control coils 56A, 56B by a power source 60. The power source 60 is in electrical communication with the first control coil 56A via first and second lead lines 62A and 62B and the power source 60 is in electrical communication with the second control coil 56B via first and second lead lines 64A and 64B. The first and second lead lines 62A and 62B connect with the ends of the first control coil 56A and the first and second lead lines 64A and 64B connect with the ends of the second control coil 56B. The power source 60 is operable to apply a current through either one of the lead lines 62A and 62B in order to apply a current to the first control coil 56A in either a first rotational direction or a second rotational direction. The applied current through the first control coil 56A creates a magnetic flux having poles dependent on the rotational direction of the applied current. Likewise, the power source 60 is operable to apply a current through either one of the lead lines 64A and 64B in order to apply a current to the second control coil 56B in either a first rotational direction or a second rotational direction.

The magnetic flux created by the control coils 56A and 56B create a magnetomotive force on the permanent magnet 50. Depending on the direction of the magnetomotive force, the permanent magnet 50 can be moved in either direction along the axis of the shift rail 16. As the permanent magnet 50 is moved, the shift rail 16 and shift fork 14 move, thereby allowing the synchronizer 12 to be selectively positioned between the engaged positions and the neutral position depending on the direction of the magnetomotive force. For example, to move the synchronizer 12 to the first engaged position, electrical current from the power source 60 is applied to both the control coils 56A and 56B in rotational directions such that the magnetomotive force from both control coils 56A and 56B are in alignment and acting on the permanent magnet 50 in the same direction, for example to the right. To move the synchronizer 12 to the second engaged position, electrical current from the power source 60 is applied to both the control coils 56A and 56B in rotational directions such that the magnetomotive force from both control coils 56A and 56B are in alignment and acting on the permanent magnet 50 in the same direction, for example to the left. To move the synchronizer 12 to the neutral position, electrical current from the power source 60 is applied to both the control coils 56A and 56B in rotational directions such that the magnetomotive force from both control coils 56A and 56B are opposed and acting on the permanent magnet 50 in opposite directions. As the shift rail 16 and shift fork 14 move between the plurality of positions, the detent system maintains the position of the shift fork 14 in the event of no electrical current is applied to the control coils 56A and 56B.

The electromagnetic actuator 18 further includes a pair of current sensors 66A and 66B. Current sensor 66A is coupled to lead line 62B and is operable to detect or sense the applied current within the lead line 62B. Current sensor 66B is coupled to lead line 64B and is operable to detect or sense the applied current within the lead line 64B. The current sensors 66A and 66B are in communication with a controller 70. The controller 70 may be a transmission control module and is preferably an electronic control device having a preprogrammed digital computer or processor, control logic, memory used to store data, and at least one I/O peripheral. The control logic includes a plurality of logic routines for monitoring, manipulating, and generating data. The controller 70 receives data signals from the sensors 66A and 66B indicative of the current applied to the control coils 56A and 56B and in addition the controller 70 is in communication with the power source 60 and receives data signals from the power source 60 indicative of the applied voltage. The controller 70 includes control logic to determine the position of the permanent magnet 50, and therefore the position of the synchronizer 12, by comparing the applied voltage to the actual currents sensed in each of the control coils 56A and 56B. When the voltage is applied to one of the control coils 56A and 56B, the electrical current induced on the other control coil is a function of the position of the permanent magnet 50 relative to the control coils 56A and 56B. Accordingly, by sensing which of the control coils 56A and 56B has an induced current, the controller 70 can determine whether the permanent magnet 50 is moved to the right in a first engaged position, to the left in a second engaged position, or in the neutral position.

Figure 2:
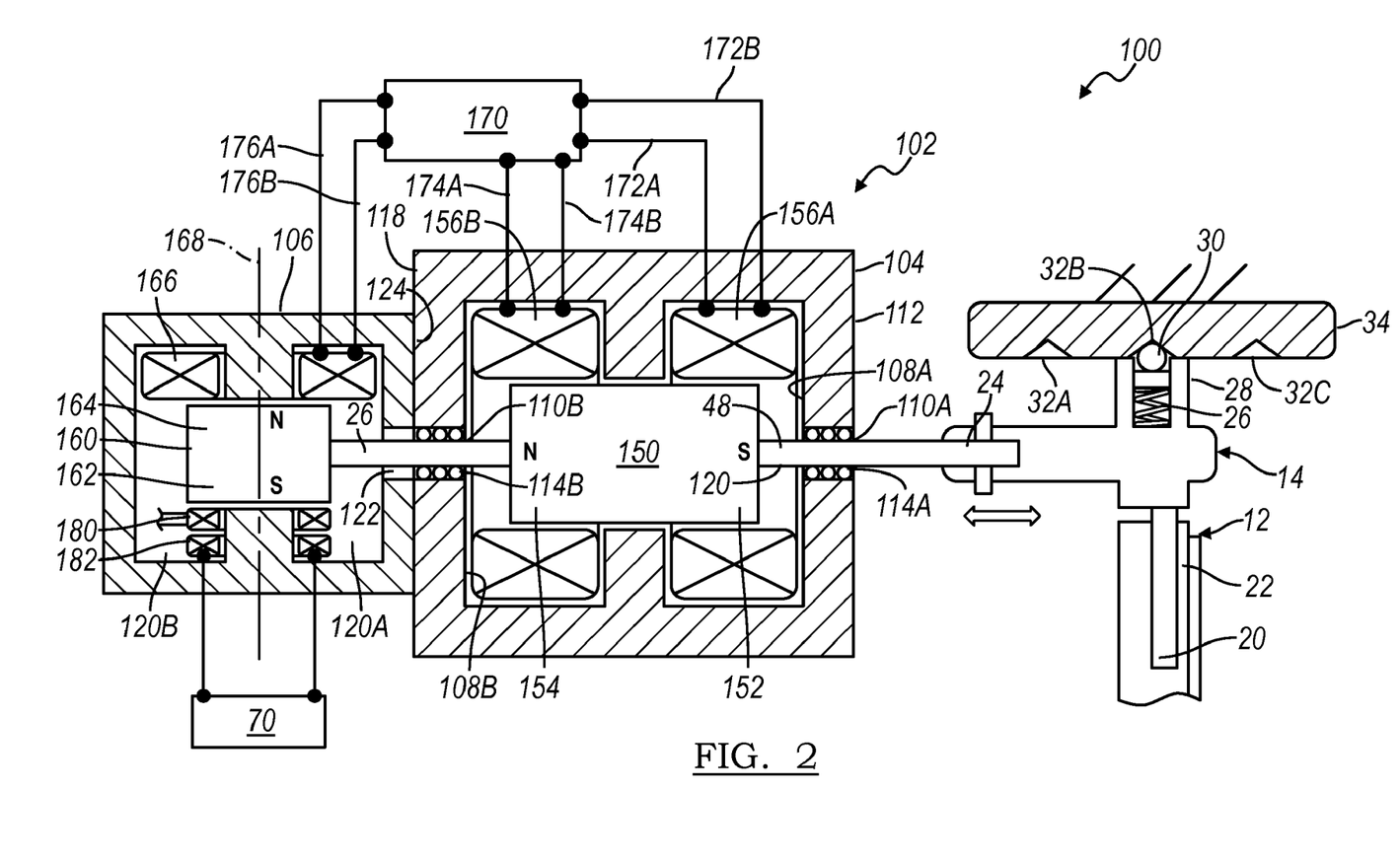
FIG. 2 is a cross-sectional view of another embodiment of a synchronizer actuating assembly according to the principles of the present invention.

Turning to FIG. 2, an alternate embodiment of a synchronizer actuating assembly is shown and generally indicated by reference number 100. The synchronizer actuating assembly 100 is similar to the synchronizer actuating assembly 10 shown in FIG. 1 and like components are indicated by like reference numbers. However, the synchronizer actuating system 100 includes an electromagnetic actuator 102. The electromagnetic actuator 102 includes a first housing 104 and a second housing 106. The first housing 104 defines two connected, spaced apart chambers 108A and 108B. A first opening 110A is disposed in a side 112 of the housing 104 and communicates with the first chamber 108A. A first linear bearing 114A is disposed within the first opening 110A. A second opening 110B is disposed in a side 118 opposite the side 112 of the housing 104 and communicates with the second chamber 108B. A second linear bearing 114B is disposed within the second opening 110B.

The second housing 106 defines two connected, spaced apart chambers 120A and 120B. A first opening 122 is disposed in a side 124 of the housing 106 and communicates with the first chamber 120A and with the second opening 110B of the first housing 104.

A portion 48 of the shift rail 16 is slidably disposed within the first housing 104 such that the shift rail 16 is supported by the linear bearings 114A and 114B. The second end 26 of the shift rail is disposed within the second housing 106. The shift rail 16, and accordingly the shift fork 14, are moveable in a linear direction as indicated by the arrows shown in FIG. 2. A permanent magnet 150 is disposed on and connected to the portion 48 of the shift rail 16 within the housing 104. The permanent magnet 150 may be any object made from a ferromagnetic material that is "magnetized" and creates its own constant magnetic field. The permanent magnet 150 includes a first pole end 152 and a second pole end 154. The first pole end 152 and the second pole end 154 are disposed opposite one another and are co-axial with the shift rail 16. The first pole end 152 is disposed within the first chamber 108A of the housing 104 and the second pole end 154 is disposed within the second chamber 108B. In the example provided, the first pole end 152 is a "South" pole and the second pole end 154 is a "North" pole end, however, it should be appreciated that the first pole end 152 and the second pole end 154 may be switched without departing from the scope of the present invention.

A first control coil 156A and a second control coil 156B are disposed within the housing 104. The first control coil 156A is disposed within the first chamber 108A. The first control coil 156A is wound around the first pole end 152 of the permanent magnet 150 forming a cylinder with the permanent magnet 150 disposed therein. The second control coil 156B is disposed within the second chamber 108B. The second control coil 156B is wound around the second pole end 154 of the permanent magnet 150 forming a cylinder with the permanent magnet 150 disposed therein. The control coils 156A and 156B are configured such that when a current is applied, the magnetomotive force from each control coil 156A and 156B act in opposite directions.

The end 26 of the shift rail 16 is slidably disposed within the second housing 106. A permanent magnet 160 is disposed on and connected to the end 26 of the shift rail 16 within the housing 106. The permanent magnet 160 may be any object made from a ferromagnetic material that is "magnetized" and creates its own constant magnetic field. The permanent magnet 160 includes a first pole end 162 and a second pole end 164. The first pole end 162 and the second pole end 164 are disposed opposite one another and are perpendicular to an axis defined by the shift rail 16. In the example provided, the first pole end 162 is a "South" pole and the second pole end 164 is a "North" pole end, however, it should be appreciated that the first pole end 162 and the second pole end 164 may be switched without departing from the scope of the present invention.

A control coil 166 is disposed within the housing 106. The control coil 166 is disposed within both of the chambers 120A and 120B. The control coil 166 is wound around and concentric with a centerline, indicated by reference number 168, that corresponds to the neutral position of the shift rail 16, the shift fork 14, and the synchronizer 12. The control coil 166 is disposed proximate the pole end 164, however, it should be appreciated that the control coil 166 may be located proximate the pole end 162 without departing from the scope of the present invention.

An electrical current is selectively applied to the control coils 156A, 156B, and 166 by a power source 170. The power source 170 is in electrical communication with the first control coil 156A via first and second lead lines 172A and 172B, with the second control coil 156B via first and second lead lines 174A and 174B, and with the control coil 166 via first and second lead lines 176A and 176B. The power source 170 is operable to selectively apply a current through the lead lines 172A, 1728, and 176A in order to apply a current to one of the first control coil 156A, the second control coil 1568, and the control coil 166.

The magnetic fluxes created by the control coils 156A, 156B, and 166 creates a magnetomotive force on the permanent magnet 150 and 160. Depending on the direction of the magnetomotive force, the permanent magnets 150 and 160 can be moved in either direction along the axis of the shift rail 16. As one of the permanent magnets 150 and 160 are moved, the shift rail 16 and shift fork 14 move, thereby allowing the synchronizer 12 to be selectively positioned between the engaged positions and the neutral position depending on the direction of the magnetomotive force.

For example, to move the synchronizer 12 to the first engaged position, a positive electrical current from the power source 60 is applied to the control coil 156A thereby generating a magnetomotive force that acts on the permanent magnet 150 and moves the permanent magnet 150 in the direction of the magnetomotive force, for example to the left. To move the synchronizer 12 to the second engaged position, a negative electrical current from the power source 60 is applied to the control coil 156B thereby generating a magnetomotive force that acts on the permanent magnet 150 and moves the permanent magnet 150 in the direction of the magnetomotive force, for example to the right. To move the synchronizer 12 to the neutral position, a positive electrical current from the power source 60 is applied to the control coil 166 thereby generating a magnetomotive force that acts on the permanent magnet 160 and moves the permanent magnet 160 to a balanced position between the control coil 166 in alignment with the centerline 168.

A pair of sensor coils 180 and 182 are disposed within the second housing 106 and are used to determine the position of the permanent magnet 160, and therefore the position of the synchronizer 12. The sensor coils 180 and 182 are disposed within both of the chambers 120A and 120B. The sensor coils 180 and 182 are wound around and concentric with the centerline 168. The sensor coil 180 is stacked atop the sensor coil 182 and is disposed between the sensor coil 182 and the permanent magnet 160. The sensor coils 180 and 182 are disposed proximate the pole end 162, however, it should be appreciated that the sensor coils 180 and 182 may be located proximate the pole end 164 without departing from the scope of the present invention if the control coil 166 is located proximate the first pole end 162.

The sensor coil 180 is in electrical communication with the power source 170 or an alternate, separate power source. The sensor coil 182 is in electrical communication with the controller 70. In order to determine the position of the permanent magnet 160, an excitation current is applied to the sensor coil 180. The current induced in the sensor coil 182 is a function of the location of the permanent magnet 160 within the magnetic flux of the sensor coil 180. Accordingly, the controller 70 can determine whether the permanent magnet 160 is moved to the right in a first engaged position, to the left in a second engaged position, or in the neutral position.

Figure 3:
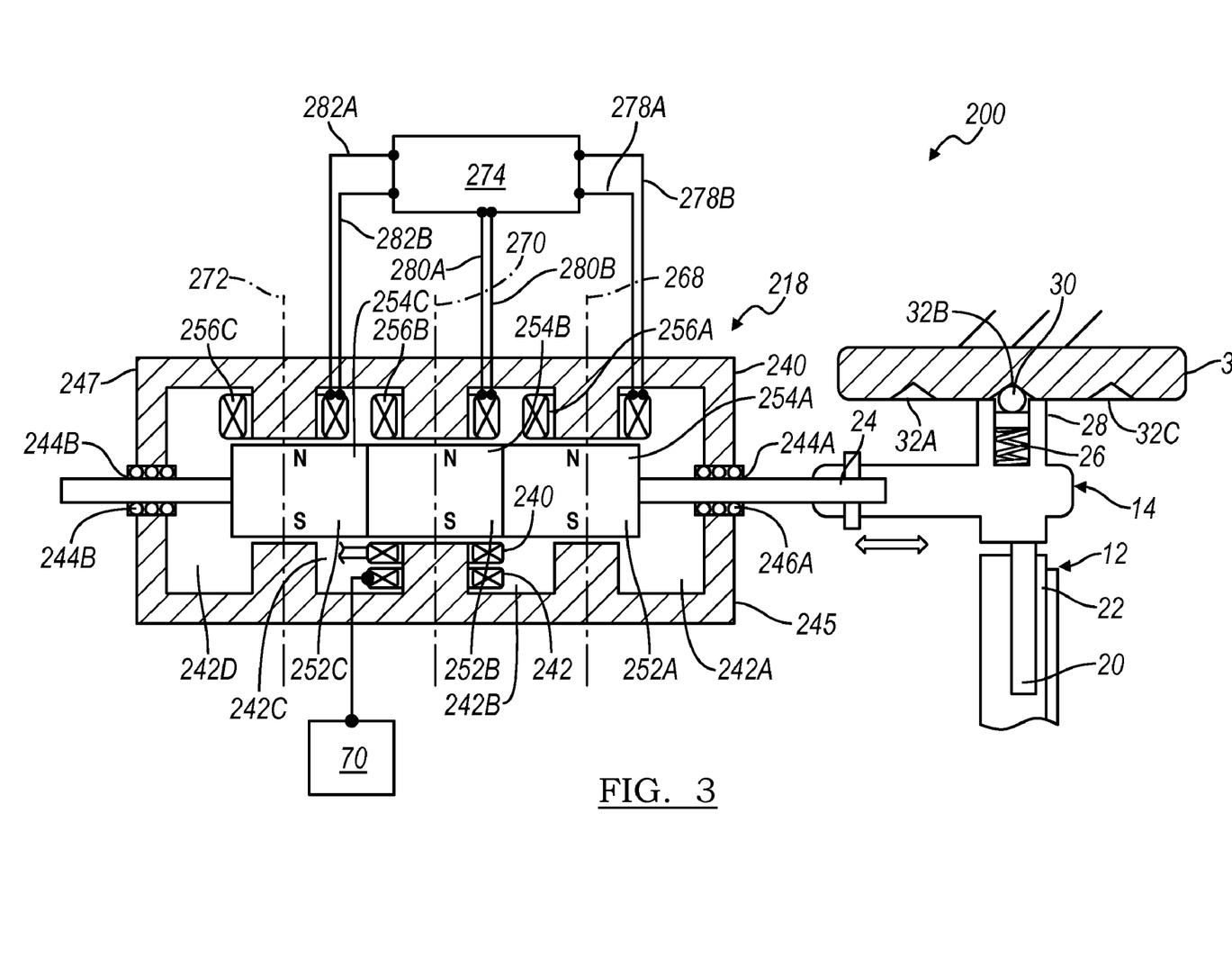
FIG. 3 is a cross-sectional view of another embodiment of a synchronizer actuating assembly according to the principles of the present invention.

With reference to FIG. 3, another embodiment of a synchronizer actuating system is generally indicated by reference number 200. The synchronizer actuating assembly 200 is similar to the synchronizer actuating assembly 10 shown in FIG. 1 and like components are indicated by like reference numbers. However, the synchronizer actuating system 200 includes an electromagnetic actuator 218. The electromagnetic actuator 202 includes a housing 240 that defines four connected, spaced apart chambers 242A, 242B, 242C, and 242D. A first opening 244A is disposed in a side 245 of the housing 240 and communicates with the first chamber 242A. A first linear bearing 246A is disposed within the first opening 244A. A second opening 244B is disposed in a side 247 opposite the side 245 of the housing 240 and communicates with the fourth chamber 242D. A second linear bearing 246B is disposed within the second opening 244B.

A portion 48 of the shift rail 16 is slidably disposed within the housing 240 of the electromagnetic actuator 218 such that the shift rail 16 is supported by the linear bearings 246A and 246B. The shift rail 16, and accordingly the shift fork 14, are moveable in a linear direction as indicated by the arrows shown in FIG. 3. Three permanent magnets 250A, 250B, and 250C are disposed on and connected to the portion 48 of the shift rail 16 within the housing 240. The permanent magnets 250A-C may be any object made from a ferromagnetic material that is "magnetized" and creates its own constant magnetic field. The permanent magnets 250A-C each include a first pole end 252A-C and a second pole end 254A-C, respectively. The first pole ends 252A-C and the second pole ends 254A-C are disposed opposite one another and are perpendicular to an axis defined by the shift rail 16. In the example provided, the first pole ends 252A are "South" poles and the second pole ends 254A-C are "North" poles, however, it should be appreciated that the first pole ends 252A-C and the second pole ends 254A-C may be switched without departing from the scope of the present invention. The permanent magnets 250A-C are disposed adjacent one another and have similar pole end orientation.

Three control coils 256A, 256B, and 256C are disposed within the housing 240. The control coil 256A is disposed within both of the chambers 242A and 242B. The control coil 256A is wound around and concentric with a centerline, indicated by reference number 268, which corresponds to a first engaged position of the shift rail 16, the shift fork 14, and the synchronizer 12. The control coil 256A is disposed proximate the pole end 254A of the permanent magnet 250A, however, it should be appreciated that the control coil 256A may be located proximate the pole end 252A without departing from the scope of the present invention.

The control coil 256B is disposed within both of the chambers 242B and 242C and is located adjacent the control coil 256A. The control coil 256B is wound around and concentric with a centerline, indicated by reference number 270, which corresponds to a neutral position of the shift rail 16, the shift fork 14, and the synchronizer 12. The control coil 256B is disposed proximate the pole end 254B of the permanent magnet 250B, however, it should be appreciated that the control coil 256B may be located proximate the pole end 252B without departing from the scope of the present invention.

The control coil 256C is disposed within both of the chambers 242C and 242D and is located adjacent the control coil 256B. The control coil 256C is wound around and concentric with a centerline, indicated by reference number 272, which corresponds to a second position of the shift rail 16, the shift fork 14, and the synchronizer 12. The control coil 256C is disposed proximate the pole end 254C of the permanent magnet 250C, however, it should be appreciated that the control coil 256C may be located proximate the pole end 252C without departing from the scope of the present invention.

An electrical current is selectively applied to the control coils 256A, 256B, and 256C by a power source 274. The power source 274 is in electrical communication with the first control coil 256A via first and second lead lines 278A and 278B, with the second control coil 256B via first and second lead lines 280A and 280B, and with the control coil 256C via first and second lead lines 282A and 282B. The power source 274 is operable to selectively apply a current through the lead lines 278A, 280A, and 282A in order to apply a current to one of the first control coil 256A, the second control coil 256B, and the third control coil 256B.

The magnetic fluxes created by the control coils 256A, 256B, and 256C creates a magnetomotive force on the permanent magnets 250A-C. Depending on the direction of the magnetomotive force, the permanent magnets 250A-C can be moved in either direction along the axis of the shift rail 16. As the permanent magnets 250A-C are moved, the shift rail 16 and shift fork 14 move, thereby allowing the synchronizer 12 to be selectively positioned between the engaged positions and the neutral position depending on the direction of the magnetomotive force.

For example, to move the synchronizer 12 to the first engaged position, a positive electrical current from the power source 274 is applied to the control coil 256A thereby generating a magnetomotive force that acts on the permanent magnet 250A and moves the permanent magnet 250A in the direction of the magnetomotive force, for example to the right. To move the synchronizer 12 to the second engaged position, a positive electrical current from the power source 274 is applied to the control coil 256C thereby generating a magnetomotive force that acts on the permanent magnet 250C and moves the permanent magnet 250C in the direction of the magnetomotive force, for example to the left. To move the synchronizer 12 to the neutral position, a positive electrical current from the power source 274 is applied to the control coil 256B thereby generating a magnetomotive force that acts on the permanent magnet 250B and moves the permanent magnet 250B to a balanced position between the control coil 256B in alignment with the centerline 270.

A pair of sensor coils 290 and 292 are disposed within the housing 240 and are used to determine the position of the permanent magnet 250B, and therefore the position of the synchronizer 12. The sensor coils 290 and 292 are disposed within both of the chambers 242B and 242C. The sensor coils 290 and 292 are wound around and concentric with the centerline 270. The sensor coil 290 is stacked atop the sensor coil 2922 and is disposed between the sensor coil 292 and the permanent magnet 250B. The sensor coils 290 and 292 are disposed proximate the pole end 252C, however, it should be appreciated that the sensor coils 290 and 292 may be located proximate the pole end 254B without departing from the scope of the present invention if the control coil 256B is located proximate the first pole end 252B.

The sensor coil 290 is in electrical communication with the power source 274 or an alternate, separate power source. The sensor coil 292 is in electrical communication with the controller 70. In order to determine the position of the permanent magnet 256B, an excitation current is applied to the sensor coil 290. The current induced in the sensor coil 292 is a function of the location of the permanent magnet 256B within the magnetic flux of the sensor coil 290. Accordingly, the controller 70 can determine whether the permanent magnet 292 is moved to the right in a first engaged position, to the left in a second engaged position, or in the neutral position.

The description of the invention is merely exemplary in nature and variations that do not depart from the gist of the invention are intended to be within the scope of the invention. Such variations are not to be regarded as a departure from the spirit and scope of the invention.

We claim the following:

1. An assembly for actuating a synchronizer in a transmission, the assembly comprising:
   a shift fork operatively associated with the synchronizer;
   a shift rail movable along an axis and connected to the shift fork;
   a permanent magnet connected to the shift rail;
   a first control coil disposed in proximity to the permanent magnet, the first control coil operable to produce a magnetomotive force on the permanent magnet in a first direction when a current is applied to the first control coil in a first rotational direction; and
   a second control coil disposed in proximity to the permanent magnet, the second control coil operable to produce a magnetomotive force on the permanent magnet in a second direction when a current is applied to the second control coil in a second rotational direction;
   wherein the permanent magnet is moved to a first position when the current is applied to the first control coil, and
   wherein the permanent magnet is moved to a second position when the current is applied to the second control coil.

2. The assembly of claim 1 wherein the first control coil is operable to produce a magnetomotive force on the permanent magnet in the second direction when a current is applied to the first control coil in the second rotational direction, wherein the second control coil is operable to produce a magnetomotive force on the permanent magnet in the first direction when a current is applied to the second control coil in the first rotational direction, wherein the permanent magnet is moved to the first position when the current is applied to the first control coil in the first rotational direction and the current is applied to the second control coil in the first rotational direction, wherein the permanent magnet is moved to the second position when the current is applied to the first control coil in the second rotational direction and the current is applied to the second control coil in the second rotational direction, and wherein the permanent magnet is moved to a third position when the current is applied to the first control coil in either the first or second rotational directions and the current is applied to the second control coil in a rotational direction opposite to that applied to the first control coil.

3. The assembly of claim 2 wherein the first position of the magnet corresponds to a first engaged position of the synchronizer, the second position of the magnet corresponds to a second engaged position of the synchronizer, and the third position of the magnet corresponds to a neutral position of the synchronizer.

4. The assembly of claim 1 further comprising a power source connected to the first and second control coils by a plurality of wires, the power source operable to apply a voltage to the first and second control coils in order to induce the current in the first and second control coils.

5. The assembly of claim 4 further comprising a current sensor coupled to at least one of the plurality of wires for sensing a current in at least one of the plurality of wires, wherein the current sensor is in communication with a controller, wherein the controller is in communication with the power source, and wherein the controller is operable to determine the position of the permanent magnet based on the sensed current and the applied voltage from the power source.

6. The assembly of claim 1 wherein the first control coil and the second control coil are disposed adjacent one another and are both coaxial with the shift rail, and wherein the permanent magnet has an axis of polarity that is coaxial with the first control coil and the second control coil, and wherein the permanent magnet is at least partially disposed within the first control coil and the second control coil.

7. The assembly of claim 6 wherein the shift rail, shift fork, and permanent magnet are moveable along an axis, and the permanent magnet has a first end having a first polarity disposed on the axis and a second end having a second polarity disposed on the axis.

8. The assembly of claim 1 further comprising a detent system connected to the shift rail for keeping the permanent magnet in one of the first, second, and third positions when no current is applied to the first and second control coils.

9. The assembly of claim 1 further comprising a second permanent magnet connected to an end of the shift rail and having an axis of polarity perpendicular to the axis of the shift rail, and further comprising a third control coil disposed in proximity to the second permanent magnet, the third control coil operable to produce a magnetomotive force on the second permanent magnet to move the second permanent magnet to be coaxial with the third control coil when a current is applied to the third control coil.

10. The assembly of claim 1 wherein the first direction of magnetomotive force is parallel with the axes of the first and second control coils and the second direction of magnetomotive force is opposite the first direction and parallel with the axes of the first and second control coils.

11. The assembly of claim 10 further comprising a first sensor coil and a second sensor coil each disposed proximate the second permanent magnet, wherein first sensor coil is connected with a power source for inducing a current in the first sensor coil, wherein the second sensor coil is in communication with a controller, wherein the controller is in communication with the power source, and wherein the controller is operable to determine the position of the second permanent magnet based on the sensed current induced in the second sensor coil and the applied voltage from the power source.

12. An assembly for actuating a synchronizer in a transmission, the assembly comprising:
   a shift fork operatively associated with the synchronizer;
   a shift rail moveable along an axis and connected to the shift fork;
   a first permanent magnet connected to the shift rail, a second permanent magnet connected to the shift rail adjacent the first permanent magnet, and a third permanent magnet connected to the shift rail adjacent the second permanent magnet, wherein the first, second, and third permanent magnets each have an axis of polarity perpendicular to the axis of the shift rail;
   a first control coil disposed in proximity to the first permanent magnet, the first control coil operable to produce a magnetomotive force on the first permanent magnet to move the first permanent magnet to be coaxial with the first control coil when a current is applied to the first control coil;
   a second control coil disposed in proximity to the second permanent magnet, the second control coil operable to produce a magnetomotive force on the second permanent magnet to move the second permanent magnet to be coaxial with the second control coil when a current is applied to the second control coil; and
   a third control coil disposed in proximity to the third permanent magnet, the third control coil operable to produce a magnetomotive force on the third permanent magnet to move the third permanent magnet to be coaxial with the third control coil when a current is applied to the third control coil.

13. The assembly of claim 12 wherein alignment of the axis of polarity of the first permanent magnet with the axis of the first control coil corresponds to a first engaged position of the synchronizer, wherein alignment of the axis of polarity of the second permanent magnet with the axis of the second control coil corresponds to a neutral position of the synchronizer, and wherein alignment of the axis of polarity of the third permanent magnet with the axis of the third control coil corresponds to a second engaged position of the synchronizer.

14. The assembly of claim 12 further comprising a power source connected to the first, second, and third control coils by a plurality of wires, the power source operable to apply a voltage to the first, second, and third control coils in order to induce the current in the first, second, and third control coils.

15. The assembly of claim 12 further comprising a detent system connected to the shift rail for keeping the synchronizer in one of the first, second, and third positions when no current is applied to the first, second, and third control coils.

16. The assembly of claim 12 further comprising a first sensor coil and a second sensor coil each disposed proximate the second permanent magnet, wherein first sensor coil is connected with a power source for inducing a current in the first sensor coil, wherein the second sensor coil is in communication with a controller, wherein the controller is in communication with the power source, and wherein the controller is operable to determine the position of the second permanent magnet based on the sensed current induced in the second sensor coil and the applied voltage from the power source.

* * * * *